(12) United States Patent
Taherzadeh Boroujeni et al.

(10) Patent No.: US 11,497,010 B2
(45) Date of Patent: Nov. 8, 2022

(54) PHYSICAL DOWNLINK CONTROL CHANNEL CANDIDATE HOPPING ACROSS CONTROL RESOURCE SETS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Konstantinos Dimou, San Francisco, CA (US); Yan Zhou, San Diego, CA (US); Hamed Pezeshki, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/061,521

(22) Filed: Oct. 1, 2020

(65) Prior Publication Data

US 2021/0105752 A1 Apr. 8, 2021

Related U.S. Application Data

(60) Provisional application No. 62/910,728, filed on Oct. 4, 2019.

(51) Int. Cl.
*H04W 72/04* (2009.01)
(52) U.S. Cl.
CPC ................. *H04W 72/042* (2013.01)
(58) Field of Classification Search
CPC .................................................. H04W 72/042
See application file for complete search history.

(56) References Cited

U.S. PATENT DOCUMENTS

| 2017/0013479 | A1* | 1/2017 | Sun | H04B 7/0632 |
| 2018/0227922 | A1 | 8/2018 | Lee et al. | |
| 2020/0053757 | A1* | 2/2020 | Bagheri | H04W 24/08 |
| 2020/0229092 | A1* | 7/2020 | Wu | H04W 52/0235 |

(Continued)

OTHER PUBLICATIONS

CATT: "UE Power Saving Scheme with Multi -Dimensional Adaptation", 3GPP Draft; 3GPP TSG RAN WG1 Meeting #94bis, R1-1810562_POWERSAVING_ADAPTATION, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 29, 2018 (Sep. 29, 2018), XP051517970, 5 Pages.

(Continued)

*Primary Examiner* — Ronald B Abelson
(74) *Attorney, Agent, or Firm* — Qualcomm Incorporated

(57) ABSTRACT

Aspects are provided which allow a base station to dynamically select or indicate an active CORESET associated with a search space or set of PDCCH candidates. The base station selects, for at least one UE, an active CORESET associated with a search space for a period of time. The base station transmits a dynamic indication of the active CORESET associated with the search space to the at least one UE. A UE receives the dynamic indication of the active CORESET associated with the search space for the period of time. The UE then monitors for a downlink control channel during the period of time based on the dynamic indication of the active CORESET.

30 Claims, 12 Drawing Sheets

(56) References Cited

U.S. PATENT DOCUMENTS

2021/0014837 A1\* 1/2021 Papasakellariou .... H04L 5/0053
2021/0153188 A1\* 5/2021 Wang ................... H04L 5/0094

OTHER PUBLICATIONS

Item 1 Continued: Retrieved from the Internet: URL: http://www.3gpp.org/ftp/tsg%5Fran/WG1%5FRL1/TSGR1%5F94b/Docs/R1%2D1810562%2Ezip, [retrieved on Sep. 29, 2018], the whole document.

International Search Report and Written Opinion—PCT/US2020/054078—ISA/EPO—dated Jan. 13, 2021.

Qualcomm Incorporated: "Beam Management for NR", 3GPP Draft; 3GPP TSG-RAN WG1 Meeting #94bis, R1-1811633, Beam Management for NR, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 30, 2018 (Sep. 30, 2018), XP051519027, 13 Pages.

Item 4 Continued: Retrieved from the Internet: URL: http://www.3gpp.org/ftp/tsg%5Fran/WG1%5FRL1/TSGR1%5F94b/Docs/R1%2D1811633%2Ezip, [retrieved on Sep. 30, 2018], the whole document.

\* cited by examiner

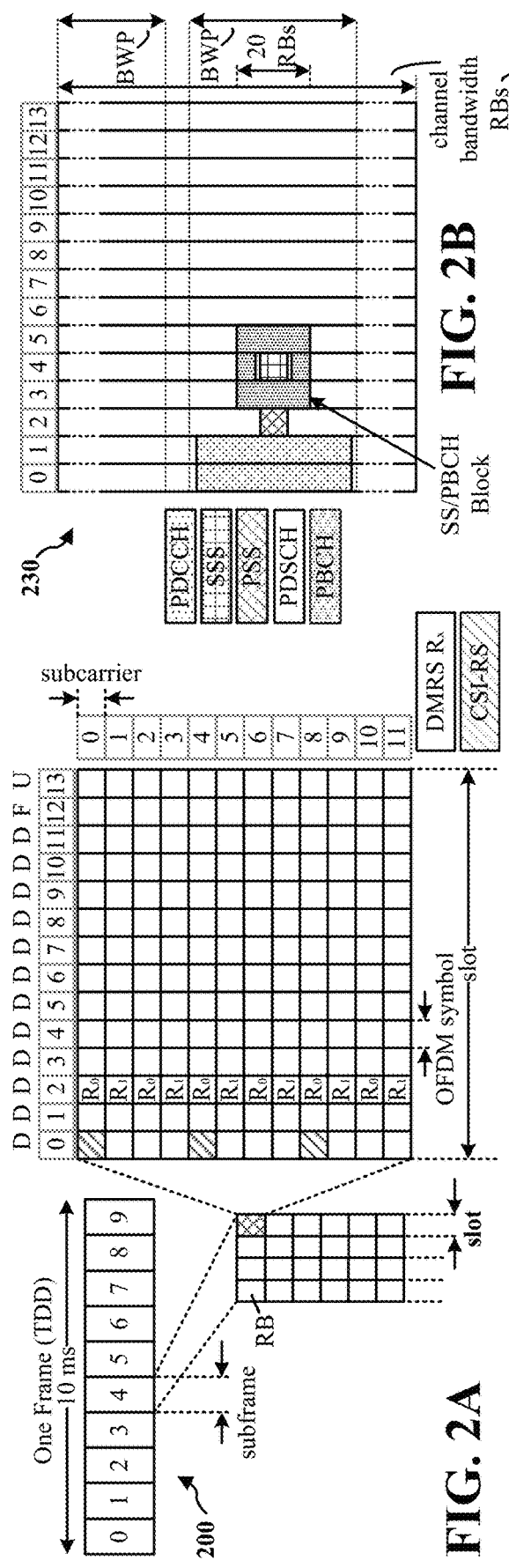
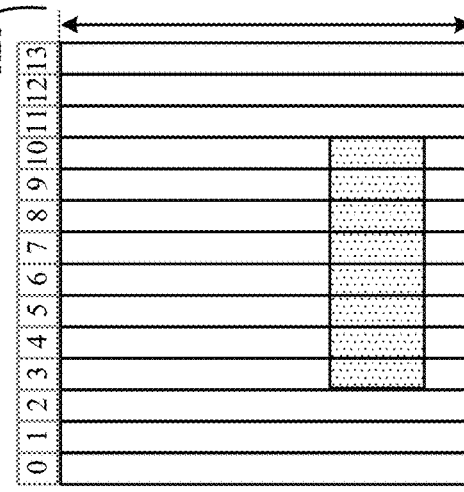
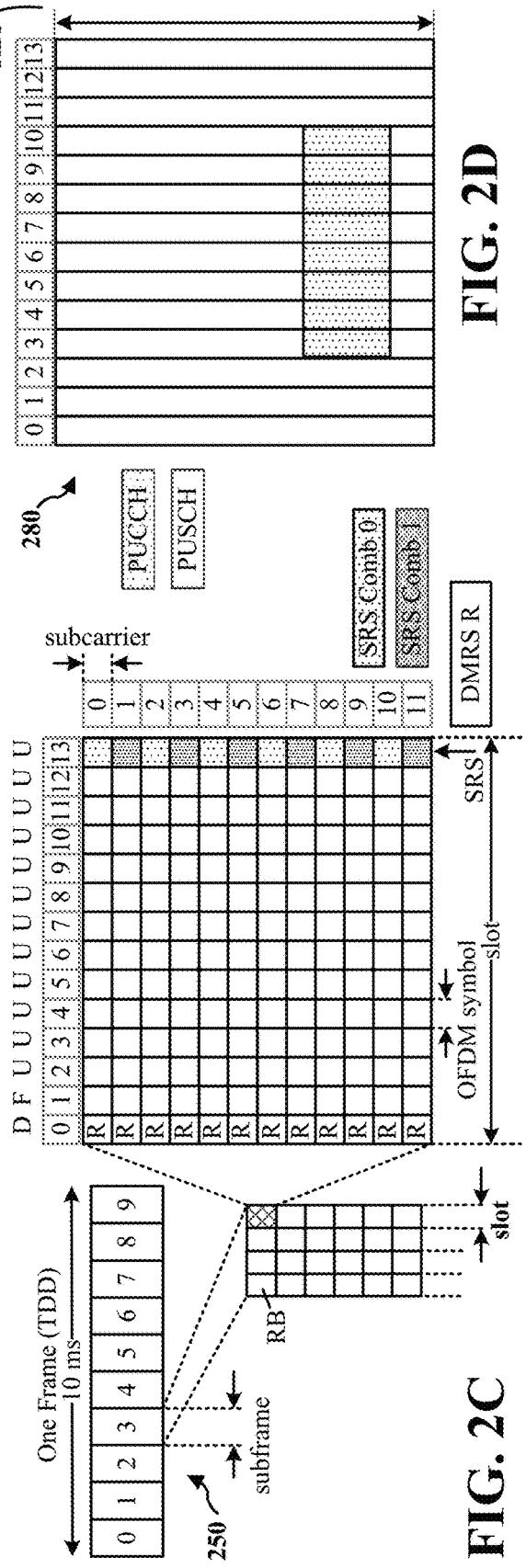
FIG. 2A  FIG. 2B  FIG. 2C  FIG. 2D

PHYSICAL DOWNLINK CONTROL CHANNEL CANDIDATE HOPPING ACROSS CONTROL RESOURCE SETS

CROSS REFERENCE TO RELATED APPLICATION(S)

This application claims the benefit of U.S. Provisional Application Ser. No. 62/910,728, entitled "PHYSICAL DOWNLINK CONTROL CHANNEL CANDIDATE HOPPING across CONTROL RESOURCE SETS" and filed on Oct. 4, 2019, which is expressly incorporated by reference herein in its entirety.

BACKGROUND

Technical Field

The present disclosure relates generally to communication systems, and more particularly, to a wireless communication between a base station and a user equipment (UE) including a control resource set (CORESET).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In order for a user equipment (UE) to receive a physical downlink control channel (PDCCH) from a base station, the UE may blindly decode a set of PDCCH candidates in a search space. The search space may be a UE specific search space associated with the UE, or a common search space associated with a group of UEs. In New Radio (NR) communication, for example, the base station may semi-statically configure parameters of the search space or the set of PDCCH candidates (e.g., an aggregation level, a resource element group (REG) to control channel element (CCE) mapping, a frequency allocation, a symbol duration, etc.). The base station may associate the search space with a single control resource set (CORESET). For example, when configuring the search space, the base station may send a radio resource configuration (RRC) message to the UE with an identifier for the CORESET, such as a Control Resource Set ID, which may indicate the parameters for the search space.

After receiving the search space configuration, the UE may perform a number of blind decodes in each slot for the set of PDCCH candidates. The base station may apply a cyclic redundancy check (CRC) to each PDCCH candidate scrambled using a radio network temporary identifier (RNTI) of the UE, and the base station may transmit the CORESET with associated parameters to the UE. When the UE receives the CORESET in a slot, the UE may perform blind decoding by receiving the PDCCH candidates, demasking the CRC based on the RNTI, and comparing the demasked CRC to an expected CRC. If a CRC error is detected or the UE cannot decode the PDCCH candidates at one aggregation level (e.g., 1), the UE repeats the process at higher aggregation levels (e.g., 2, 4, 8, etc.) until no CRC error is detected and decoding is successful. Thus, the search space configuration (e.g., the aggregation level) may limit the total number of blind decodes that the UE may perform in each slot and the total number of CCEs including the PDCCH candidates. After successfully decoding the PDCCH candidates, the UE may identify downlink control information (DCI) in the PDCCH and may subsequently receive scheduled data in a physical downlink shared channel (PDSCH) from the base station.

Aspects presented herein enable a base station to dynamically change the set of PDCCH candidates that a UE monitors, or to dynamically change the parameters of the CORESET. For example, if a UE is suffering from interference or otherwise has difficulty receiving data from the base station, the base station may increase the aggregation level and/or duration of the CORESET to increase the likelihood of successful UE decoding. The base station may also change the frequency allocation or other parameters to provide more flexibility in PDCCH scheduling to such UEs. Alternatively, if a UE has low-power requirements, the base station may decrease the aggregation level to reduce the possible number of blind decodes by the UE and reduce the power consumption of the UE. Moreover, when the set of PDCCH candidates are transmitted to multiple UEs over overlapping resources (e.g. in a common search space), the base station may change the aggregation level and/or other parameters of the CORESET to satisfy the power and timing requirements of different classes of UEs (e.g. eMBB and URLLC). Accordingly, the present disclosure allows a base station to dynamically select and/or indicate an active CORESET associated with a search space or set of PDCCH candidates.

In an aspect of the disclosure, a method, a computer-readable medium, and an apparatus are provided for wireless communication at a base station. The apparatus selects, for at least one UE, an active CORESET associated with a search space for a period of time. The apparatus transmits a dynamic indication of the active CORESET associated with the search space to the at least one UE.

In another aspect of the disclosure, a method, a computer-readable medium, and an apparatus are provided for wireless communication at a UE. The apparatus receives a dynamic indication of an active CORESET associated with a search space for a period of time. The apparatus monitors for a downlink control channel during the period of time based on the dynamic indication of the active CORESET.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
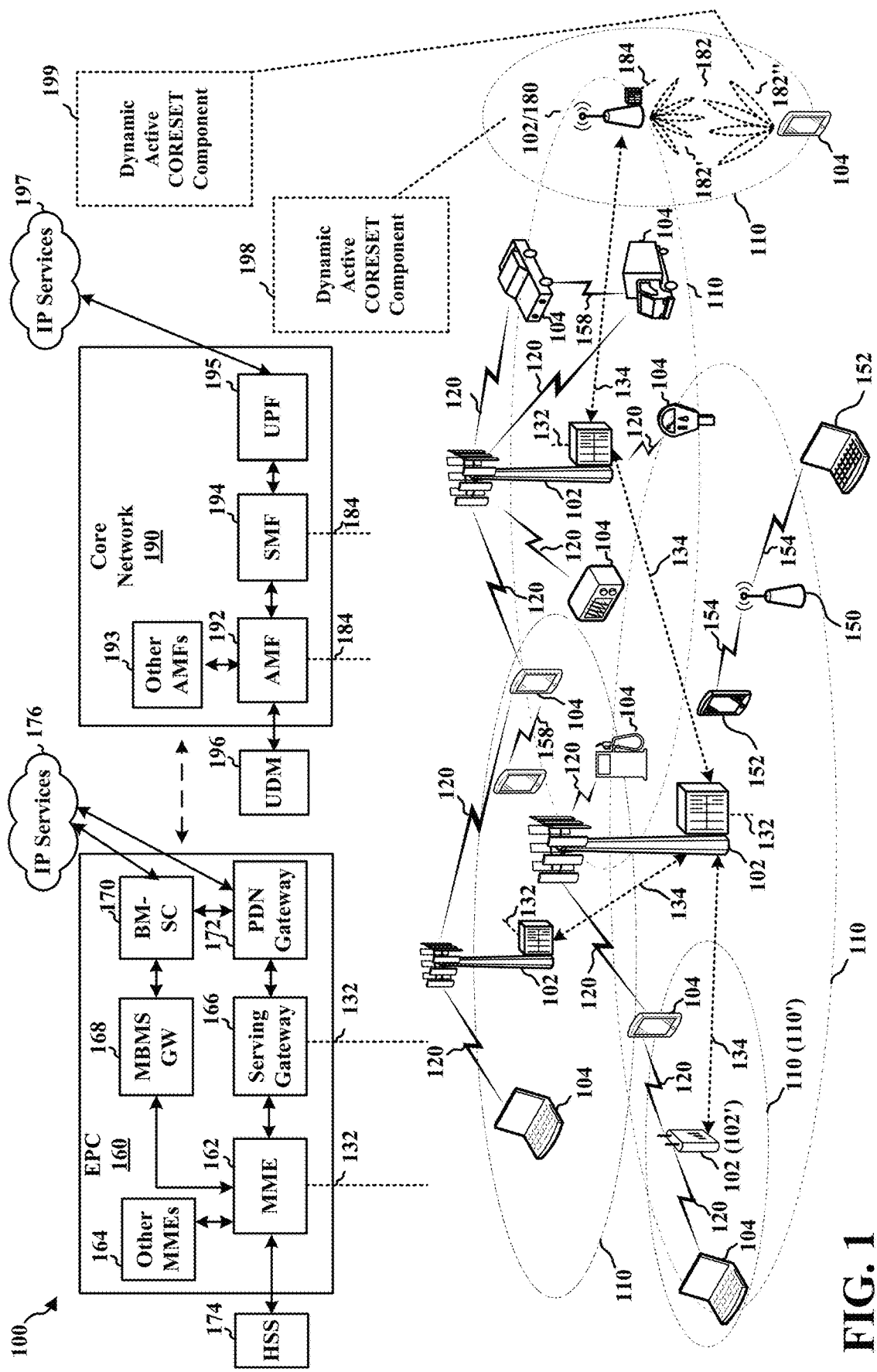
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may include a dynamic active control resource set (CORESET) component 198 which is configured to select, for at least one UE 104, an active CORESET associated with a search space for a period of time and to transmit a dynamic indication of the active CORESET associated with the search space to the at least one UE 104. Moreover, in certain aspects, the UE 104 may include a dynamic active CORESET component 199 which is configured to receive a dynamic indication of an active CORESET associated with a search space for a period of time and to monitor for a downlink control channel from the base station 102/180 during the period of time based on the dynamic indication of the active CORESET. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
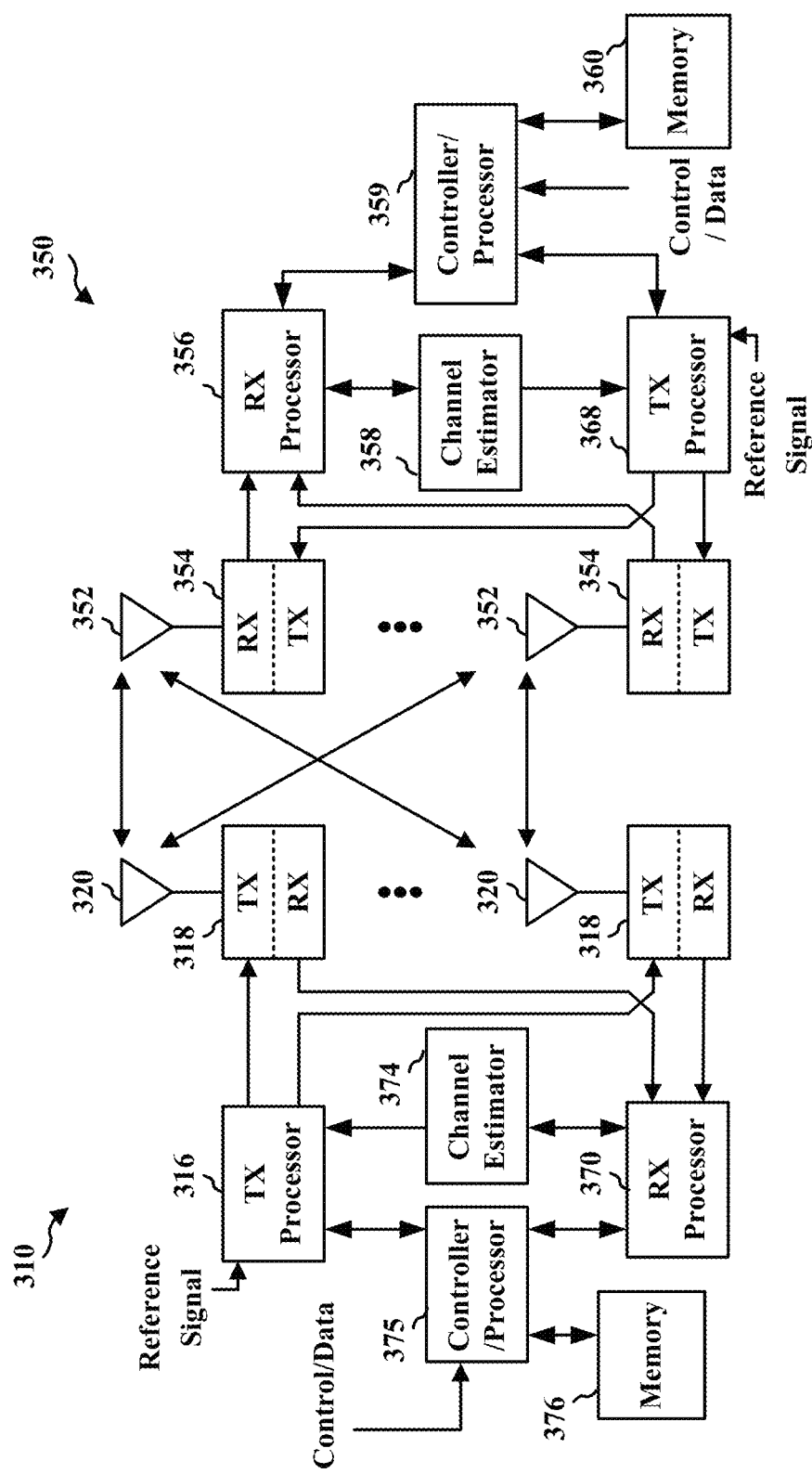
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

In order for a UE to receive a PDCCH from a base station, the UE may blindly decode a set of PDCCH candidates in a search space. The search space may be a UE specific search space associated with the UE, or a common search space associated with a group of UEs. The base station may semi-statically configure parameters of the search space or the set of PDCCH candidates (e.g., an aggregation level, an REG-to-CCE mapping, a frequency allocation, a symbol duration, etc.). The base station may associate the search space with a single CORESET. For example, when configuring the search space, the base station may send an RRC message to the UE with an identifier for the CORESET, such as a Control Resource Set ID, which may indicate the parameters for the search space.

Figure 4:
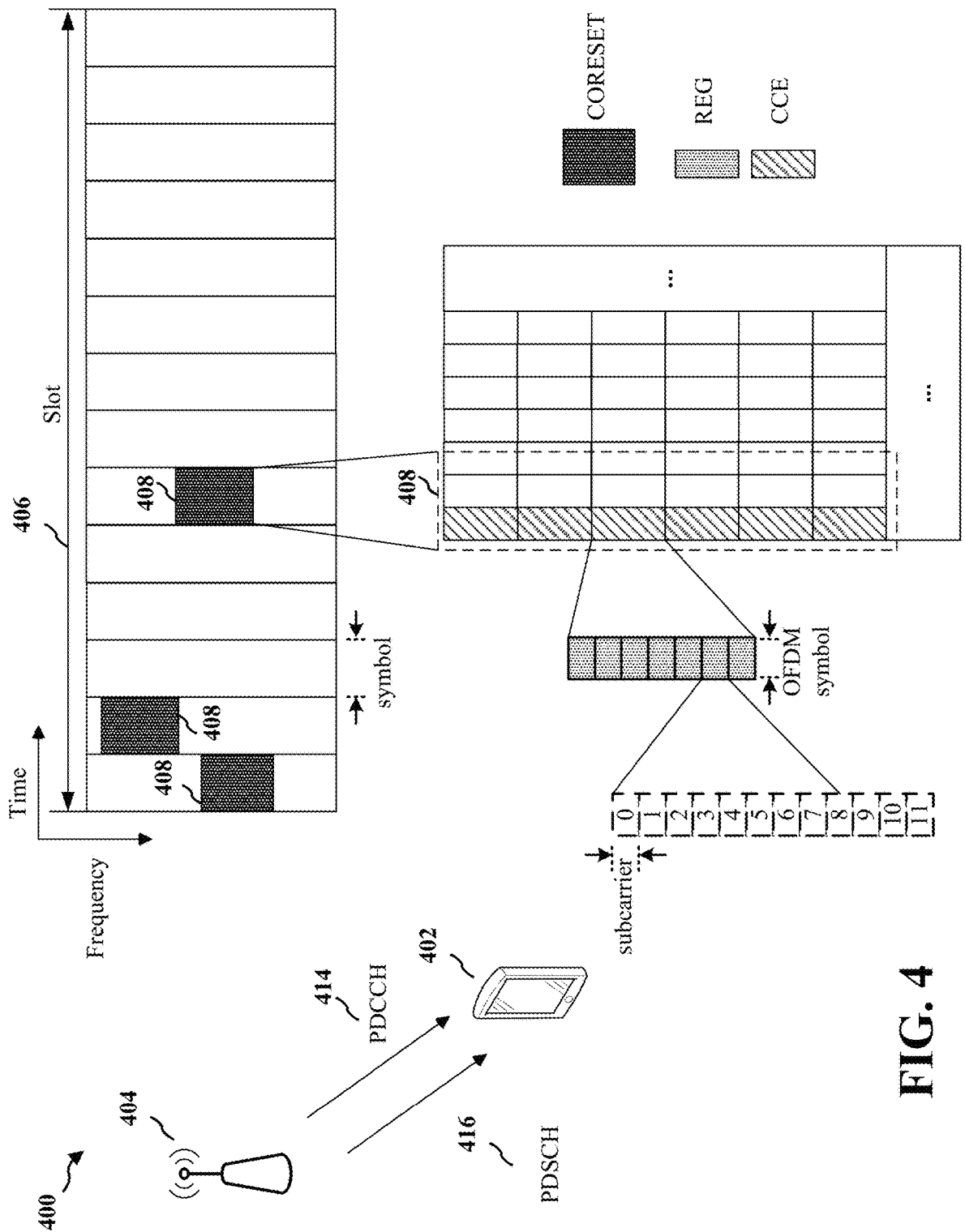
FIG. 4 is a diagram illustrating an example of a UE receiving a set of PDCCH candidates from a base station in a search space.

FIG. 4 illustrates an example diagram 400 of a UE 402 receiving a set of PDCCH candidates from a base station 404 in a search space. The search space may be, for instance, a user-specific search space dedicated for the UE 402. During one or more slots 406, the base station may provide a CORESET 408 to the UE including semi-statically configured parameters associated with that CORESET. For instance, the CORESET 408 may be configured with a specified aggregation level (e.g. 1, 2, 4, 8, etc.), an allocation of resources in frequency, an allocation of symbols in time (e.g. a duration of 1, 2, or 3), and a REG-to-CCE mapping (e.g. with or without interleaving). In the example of FIG. 4, the CORESET 408 includes a single PDCCH candidate, one aggregation level, six adjacent REGs or resource blocks (RBs) mapped to one CCE without interleaving, and a duration of one symbol.

After receiving the search space configuration, the UE may perform a number of blind decodes in each slot for the set of PDCCH candidates. The base station may apply a cyclic redundancy check (CRC) to each PDCCH candidate scrambled using a radio network temporary identifier (RNTI) of the UE, and the base station may transmit the CORESET with associated parameters to the UE. When the UE receives the CORESET in a slot, the UE may perform blind decoding by receiving the PDCCH candidates, demasking the CRC based on the RNTI, and comparing the demasked CRC to an expected CRC. If a CRC error is detected or the UE cannot decode the PDCCH candidates at one aggregation level (e.g., 1), the UE repeats the process at higher aggregation levels (e.g., 2, 4, 8, etc.) until no CRC error is detected and decoding is successful. Thus, the search space configuration (e.g., the aggregation level) may limit the total number of blind decodes that the UE may perform in each slot and the total number of CCEs including the PDCCH candidates. After successfully decoding the PDCCH candidates, the UE may identify DCI in the PDCCH and may subsequently receive scheduled data in a PDSCH from the base station.

Thus, in the example of FIG. 4, the UE 402 monitors each slot 406 for the CORESET 408. To identify the PDCCH candidate in the CCE, the UE 402 may perform blind decoding. If decoding is successful, the UE subsequently receives a DCI in the PDCCH 414. The UE 402 may then receive data from the base station 404 on the PDSCH 416.

Aspects presented herein enable a base station to dynamically change the set of PDCCH candidates that a UE monitors, or to dynamically change the parameters of the CORESET. For example, if a UE is suffering from interference or otherwise has difficulty receiving data from the base station, the base station may increase the aggregation level and/or duration of the CORESET to increase the likelihood of successful UE decoding. The base station may also change the frequency allocation or other parameters to provide more flexibility in PDCCH scheduling to such UEs. Alternatively, if a UE has low-power requirements, the base station may decrease the aggregation level to reduce the possible number of blind decodes by the UE and reduce the power consumption of the UE. Moreover, when the set of PDCCH candidates are transmitted to multiple UEs over overlapping resources (e.g. in a common search space), the base station may change the aggregation level and/or other parameters of the CORESET to satisfy the power and timing requirements of different classes of UEs (e.g. eMBB and URLLC).

Accordingly, aspects of the present disclosure enable a base station to dynamically select and/or indicate an active CORESET associated with a search space or set of PDCCH candidates. The base station may pre-configure a set of CORESETs associated with a search space for the UE, and the base station may dynamically select and indicate one of the pre-configured CORESETs as the active CORESET for the UE to monitor in a given time slot or a set of consecutive time slots. For example, the base station may configure two CORESETs with fixed parameter values and having separate indices, and the base station may dynamically signal a bit indicating one of the two indices as the active CORESET for the UE to monitor in the current time slot, the next time slot, or a set of upcoming time slots. The index of the selected active CORESET may also affect the beam used by the UE to receive the PSDCH and/or any quasi-colocation (QCL) assumptions applied by the UE. In one example, the base station may dynamically indicate the active CORESET in a MAC-control element (MAC-CE) for a set of upcoming time slots or PDCCH monitoring occasions. In another example, the base station may dynamically indicate the active CORESET in a DCI. The DCI may indicate the active CORESET(s) for multiple search spaces.

The base station may also pre-configure different parameter values for a single active CORESET, and the base station may dynamically select different parameter values for the active CORESET. For instance, the base station may select different parameters for a CORESET such as a REG bundle type and/or REG-to-CCE mapping, (e.g. interleaving or non-interleaving), frequency allocation, and/or number of symbols, and may dynamically indicate the parameters to the UE under a single CORESET index. As an example, the base station may configure a CORESET with either interleaving or non-interleaving REG-to-CCE mapping, and the base station may dynamically signal a bit (e.g. in DCI) indicating whether the active CORESET is interleaving or non-interleaving. The base station may also preconfigure a set of multiple frequency resource allocations or other parameter values for a CORESET, and the base station may dynamically indicate (e.g. in DCI) the active frequency allocation or other parameter values from the set for the specified CORESET. In this way, the base station may select a CORESET associated with a single identifier or index and dynamically vary the parameter values for that CORESET, rather than selecting different CORESETs with fixed parameter values.

The selection and/or indication of the active CORESET, or active parameters of the CORESET, may be done for a defined set of upcoming slots and/or monitoring occasion. Alternatively, this selection and/or indication may be valid for all the upcoming slots and/or monitoring occasions until another selection and/or indication cancels and/or overwrites it.

Figure 5:
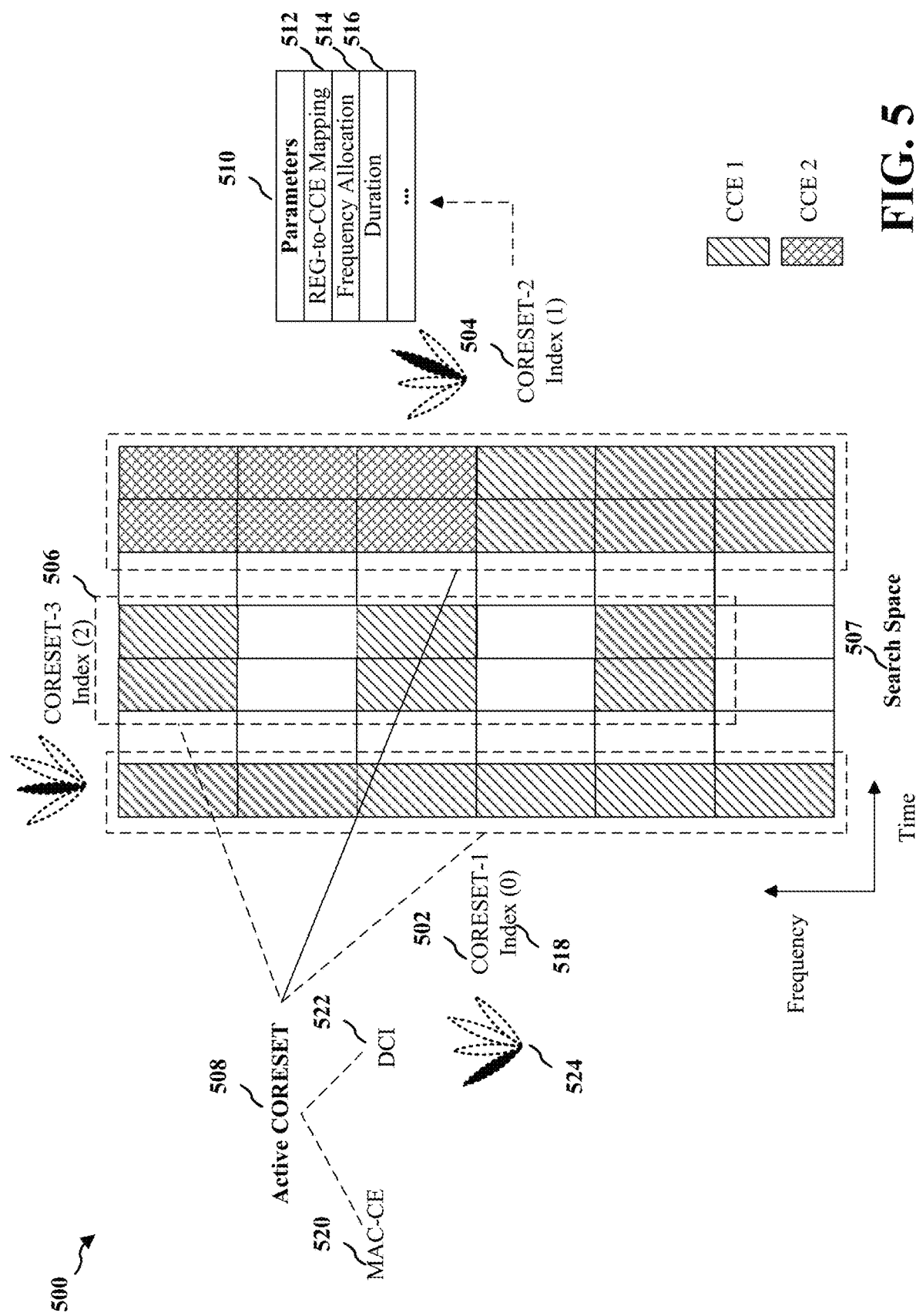
FIG. 5 is a diagram illustrating different examples of CORESETs associated with a search space from which an active CORESET may be dynamically selected and indicated.

FIG. 5 illustrates an example diagram 500 of different examples of CORESETs 502, 504, 506 associated with a search space 507 from which an active CORESET 508 may be dynamically selected and indicated. In one example, a base station (e.g. base station 404 of FIG. 4) may pre-configure a set of CORESETs 502, 504, 506 each including different parameters 510. The parameters 510 may include, for example, an REG-to-CCE mapping 512, a frequency allocation 514, and a number of symbols or duration 516. Other parameters such as aggregation level, etc. may be included in the parameters 510. In the example of FIG. 5, the base station may pre-configure a first CORESET 502 (e.g. CORESET-1) including an aggregation level of one, a REG-to-CCE mapping 512 of six REGs to one CCE (non-interleaving), a frequency allocation 514 of six REGs or RBs, and a duration 516 of one symbol. The base station may also preconfigure a second CORESET 504 (e.g. CORESET-2) including an aggregation level of two, a REG-to-CCE mapping 512 of six REGs to one CCE (non-interleaving), a frequency allocation 514 of twelve REGs or RBs, and a duration 516 of two symbols. Additionally, the base station may preconfigure a third CORESET 506 (e.g. CORESET-3) including an aggregation level of one, a REG-to-CCE mapping 512 of six REGs to one CCE (interleaving), a frequency allocation 514 of six REGs or RBs, and a duration of two symbols. The base station may assign an index 518 to CORESET-1, CORESET-2, and CORESET-3, e.g. 0, 1, 2, respectively. While FIG. 5 illustrates an example of three CORESETS 502, 504, 506 with the aforementioned parameters 510, any number of CORESETs may be configured with any combination of the parameters 510, and at any time-frequency resources.

After the base station pre-configures the set of CORESETs (e.g. CORESETs 502, 504, 506), the base station may transmit the configurations to the UE. The configured set of CORESETs may be included, for example, in a RRC message to the UE configuring the search space 507. The base station may then dynamically select the active CORESET 508 from the set of CORESETs 502, 504, 506 (e.g. based on scheduling needs, UE power and timing requirements, etc.), and indicate the active CORESET 508 to the UE in a MAC-CE 520, a DCI 522, or other message. The base station may also indicate the slot(s) during which the active CORESET 508 may be applied. For instance, the base station may select CORESET-2 504 as the active CORESET 508 and dynamically indicate the index (1) of that CORESET (e.g. using one or more bits) as well as one or more slots to apply the active CORESET in the message to the UE. After receiving the index 518, the UE may determine the parameters of the active CORESET 508 from the set of preconfigured CORESETs that the UE previously received from the base station, and the UE proceeds to monitor for the PDCCH candidates associated with the active CORESET 508 in the indicated slot(s).

The indicated slot(s) may be the slot in which the indication is received, the next slot, or a set of upcoming consecutive (or non-consecutive) slots. For example, referring to FIG. 4, the base station 404 may dynamically indicate for the UE to monitor for the PDCCH candidates in the active CORESET in the slot 406 expanded in FIG. 4 or in one or more subsequent slots 406. For example, the base station may indicate the active CORESET for a set of upcoming slots or monitoring occasions when it transmits a DCI to the UE in PDCCH or a MAC-CE to the UE in PDSCH. The UE may then monitor for subsequent PDCCH candidates based on the DCI or MAC-CE. Additionally, a single DCI may indicate the active CORESET(s) for multiple search spaces. For instance, referring back to FIG. 5, each CORESET 502, 504, 506 may be configured with the same respective parameters for different search spaces 507 (e.g. common and UE-specific search spaces), and the UE may monitor upcoming slots for the indicated active CORESET in any of the different search spaces.

The index 518 of the selected active CORESET 508 may also impact the beam the UE may use to receive the PDSCH and/or any QCL assumptions the UE may apply to receive the PDSCH (e.g. after successfully decoding the PDCCH based on the active CORESET 508). For instance, FIG. 5 illustrates that each CORESET 502, 504, 506 may be associated with a different beam 524. Thus, when the base station selects the CORESET-2 504 as the active CORESET 508, the base station may indicate the beam 524 associated with CORESET-2 504 to the UE (e.g. in the MAC-CE 520 or DCI 522), and the base station may transmit PDSCH and the UE may receive PDSCH using the beam 524. Alternatively, the base station may not indicate the beam 524 associated with the active CORESET 508 to the UE, in which case the UE may use a default beam to receive the PDSCH based for example on the lowest CORESET-ID within the slot. For instance, since CORESET-1 502 has the lowest index (0) in the example of FIG. 5, the UE may determine to receive PDSCH based on the beam 524 associated with CORESET-1 even if the base station dynamically indicates CORESET-2 (or another CORESET) as the active CORESET.

The base station may alternatively preconfigure different parameters 510 for each CORESET 502, 504, 506, and dynamically select and indicate the parameters 510 for the active CORESET 508 without changing the index 518. For example, after selecting CORESET-2 504 as the active CORESET 508 as described above, the base station may later determine based on scheduling requirements, UE power and timing requirements, etc. that the parameters of CORESET-3 506 may be more suitable for a current slot or set of upcoming slots. In the aforementioned example, the base station may indicate this change by sending a MAC-CE 520 or DCI 522 to the UE with the new index 518 associated with CORESET-3 506. However, in this example the base station may alternatively alter the parameters 510 of CORESET-2 to those of CORESET-3 (e.g. the base station may reduce the aggregation level to one and change the REG-to-CCE mapping 512 to interleaving as illustrated in CORESET-3 506).

The base station may pre-configure any combination of parameters 510 for an active CORESET 508 and transmit those different sets of parameters to the UE, for example, in an RRC message configuring the search space 507. The base station may then dynamically select the parameters 510 of the active CORESET 508 according to any of the pre-configured combinations of parameters 510 (e.g. based on scheduling needs, UE power and timing requirements, etc.), and indicate the active CORESET 508 to the UE in the MAC CE 520, DCI 522, or any other message through its parameters 510. For instance, the base station may select a single active CORESET 508 having a default set of parameters 510 matching those of CORESET-2 504 described above and illustrated in FIG. 5 (or the other CORESETs 502, 506), and dynamically indicate changes to the parameters (e.g. a different REG bundle type, REG-to-CCE mapping with interleaving or non-interleaving, frequency allocation, number of symbols, and/or aggregation level) in the message to the UE. As an example, the base station may send a DCI to the UE including a bit indicating whether the active CORESET 508 has non-interleaving REG-to-CCE mapping (as illustrated in CORESET-1 502 and CORESET-2 504) or interleaving REG-to-CCE mapping (as illustrated in CORESET-3 506). Similarly, the DCI may include one or more bits indicating the frequency allocation 514 for the active CORESET 508 from a set of frequency allocations in the preconfigured parameters 510. The message may also include the indicated slot(s) in which the active CORESET 508 with the indicated parameters will be applied. After receiving the dynamic indication, the UE may proceed to monitor for the PDCCH candidates associated with the active CORESET 508 in the indicated slot(s) based on the default or changed parameters.

Figure 6:
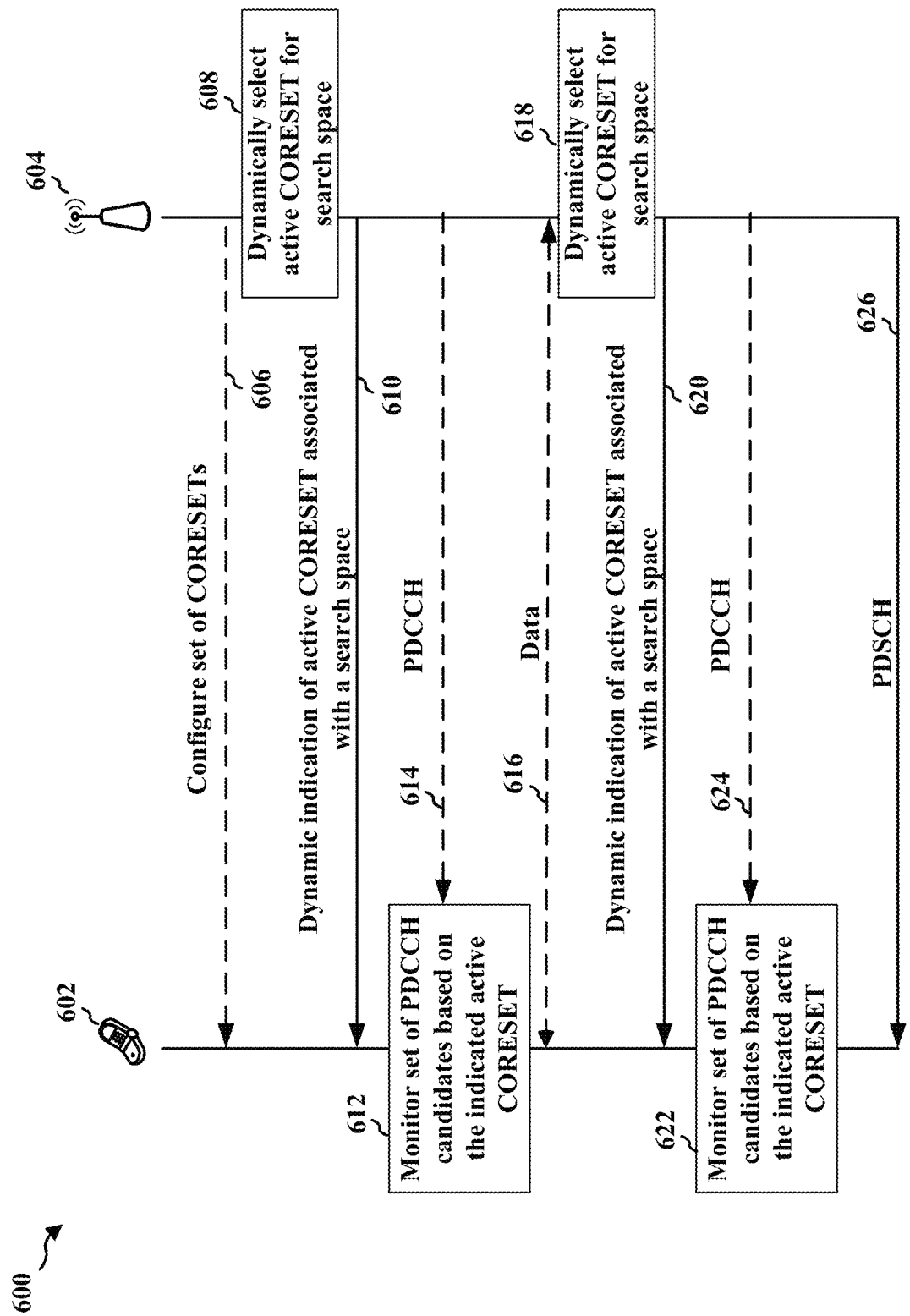
FIG. 6 is a call flow diagram between a UE and a base station illustrating an example in which the base station transmits and the UE receives a dynamic indication of an active CORESET for receiving a PDCCH.

FIG. 6 illustrates a call flow diagram 600 between a UE 602 and a base station 604 in which the base station transmits and the UE receives a dynamic indication of an active CORESET for receiving a PDCCH. The UE 602 may correspond to the UE 402 and the base station 604 may correspond to the base station 404 of FIG. 4. The dynamic indication may refer to an index, parameter, or slot that the base station may change for an active CORESET in response to changes in scheduling flexibility constraints or UE power or timing requirements. For example, the dynamic indication may be an index selected from a set of preconfigured CORESETs for association with an active CORESET based on scheduling flexibility constraints, the dynamic indication may be a parameter selected from a preconfigured set of parameters (e.g., aggregation levels, REG-to-CCE mappings, frequency allocations, symbol durations, etc.) to associate with an active CORESET based on UE blind decoding power requirements, or the dynamic indication may be a slot selected for applying an active CORESET based on UE timing requirements. For example, if a UE is suffering from interference or otherwise has difficulty receiving data from the base station, the base station may change the CORESET (by its index), change a parameter of the CORESET such as aggregation level, frequency allocation, and/or duration, or change the slot for monitoring the CORESET, in order to increase the likelihood of successful UE decoding, reduce the possible number of blind decodes by the UE, and reduce the power consumption of the UE, and provide more flexibility in PDCCH scheduling to such UEs. The dynamic indication the base station transmits to the UE may include the changed CORESET index, parameter, or slot which the base station selects based on such factors.

The base station 604 may first configure and provide a set of CORESETs 606 to the UE. For example, referring to FIG. 5, the base station may configure a set of CORESETs 502, 504, 506 including different parameters 510 and associated indices 518 and provide the preconfigured CORESETs to the UE. The base station may alternatively or additionally configure a set of parameters 510 for a single active CORESET 508 and provide the preconfigured set of parameters to the UE. The set of CORESETs 606 or parameters may be provided to the UE, for example, in a RRC message.

The base station 604 then dynamically selects the active CORESET for a search space at block 608. For example, referring to FIG. 5, the base station may select an active CORESET 508 from the set of CORESETS 502, 504, 506 for a search space 507 based on scheduling flexibility constraints, UE blind decoding power requirements, eMBB or URLLC UE power or timing requirements, or other factors. The search space may be, for example, a UE-specific search space for the UE 602, or a common search space for multiple UEs. In one example, the base station may select an active CORESET 508 by its index 518, which is uniquely assigned for different CORESETs. In another example, the base station may select one or more parameters 510 of an active CORESET 508 under a single index 518 associated with one CORESET.

After selecting the active CORESET at block 608, the base station 604 provides the dynamic indication 610 of the active CORESET associated with the search space to the UE 602. The dynamic indication may be provided in a MAC-CE, a DCI, or another message. For example, referring to FIG. 5, after the base station selects the active CORESET 508, the base station may transmit the index 518 or parameters 510 associated with the active CORESET in a MAC-CE 520 or a DCI 522 to the UE. The dynamic indication may also include the indicated slot(s) in which the active CORESET 508 is applied. The indicated slot may be the slot in which the dynamic indication is received (e.g. slot 406 of FIG. 4), a next time slot, or one or more upcoming consecutive or non-consecutive time slots.

Based on the dynamic indication of the active CORESET, the UE 602 monitors for a set of PDCCH candidates from the base station 604 at block 612. For example, the UE may perform blind decoding of the set of PDCCH candidates associated with the active CORESET in the indicated slot(s) as described above. For instance, referring to FIG. 5, when the UE receives the index 518 of CORESET-2 504 or its parameters 510 in the dynamic indication, the UE may perform blind decoding of the PDCCH candidates in a CORESET of two aggregation levels, a REG-to-CCE mapping 512 of six REGs to one CCE, a frequency allocation 514 of twelve REGs or RBs, and a duration 516 of two symbols. If decoding is successful, the UE receives the PDCCH 614. After receiving the PDCCH 614, the UE 602 and the base station 604 may communicate data 616 to each other (e.g. in PDSCH, PUSCH, etc.).

Subsequently, the base station 604 may dynamically select another active CORESET for the search space at block 618. For example, referring to FIG. 5, if the base station previously selected CORESET 504 (e.g. CORESET-2) as the active CORESET 508 for one set of slot(s), the base station may determine to select a different CORESET 506 (e.g. CORESET-3) as the active CORESET 508 for another set of slot(s) for the search space 507. The determination may be based on scheduling flexibility constraints, UE blind decoding power requirements, eMBB or URLLC UE power or timing requirements, or other factors. For instance, if the UE sends channel quality information (CQI) to the base station 604 in data 616, the base station may determine that the UE 602 suffers from interference and needs a higher aggregation level or greater duration to increase blind decoding success. In one example, the base station may select the new active CORESET 508 by its index 518. Alternatively, rather than selecting a different index 518, the base station may select a different combination of parameters 510 for the new active CORESET 508 under the same index 518.

After selecting the new active CORESET at block 618, the base station 604 provides the dynamic indication 620 of the new active CORESET associated with the search space to the UE 602. The dynamic indication may be provided in a MAC-CE, a DCI, or another message. For example, referring to FIG. 5, after the base station selects the active CORESET 508, the base station may transmit the new index 518 or different parameters 510 associated with the active CORESET in a MAC-CE 520 or a DCI 522 to the UE. The dynamic indication may also include the indicated slot(s) in which the active CORESET 508 is applied. The indicated slot may be the slot in which the dynamic indication is received (e.g. slot 406 of FIG. 4), a next time slot, or one or more upcoming consecutive or non-consecutive time slots.

Based on the dynamic indication of the new active CORESET, the UE 602 monitors for a set of PDCCH candidates from the base station 604 at block 622. For example, the UE may perform blind decoding of the set of PDCCH candidates associated with the new active CORESET in the indicated slot(s) as described above. For instance, referring to FIG. 5, when the UE receives the new index 518 of CORESET-3 506 or its different parameters 510 in the updated dynamic indication, the UE may perform blind decoding of the PDCCH candidates in a CORESET of one aggregation level, a REG-to-CCE mapping 512 of six REGs to one CCE with interleaving, a frequency allocation 514 of six REGs or RBs, and a duration 516 of two symbols. If decoding is successful, the UE receives the PDCCH 624.

After receiving the PDCCH 624 (or PDCCH 614), the base station 604 may transmit and the UE 602 may receive the PDSCH 626 using a beam associated with the active CORESET. The beam may be an indicated beam (e.g. in the dynamic indication 610 or 620), or a default beam (e.g. if no beam is indicated). For example, referring to FIG. 5, each CORESET 502, 504, 506 may be associated with a different beam 524, and the base station may transmit and the UE may receive PDSCH using the corresponding beam indicated for the active CORESET 508. Alternatively, for default beams, the base station may transmit and the UE may receive PDSCH using the beam 524 associated with the lowest CORESET ID in the indicated slot (e.g. CORESET-1) regardless of which active CORESET 508 is selected.

Figure 7:
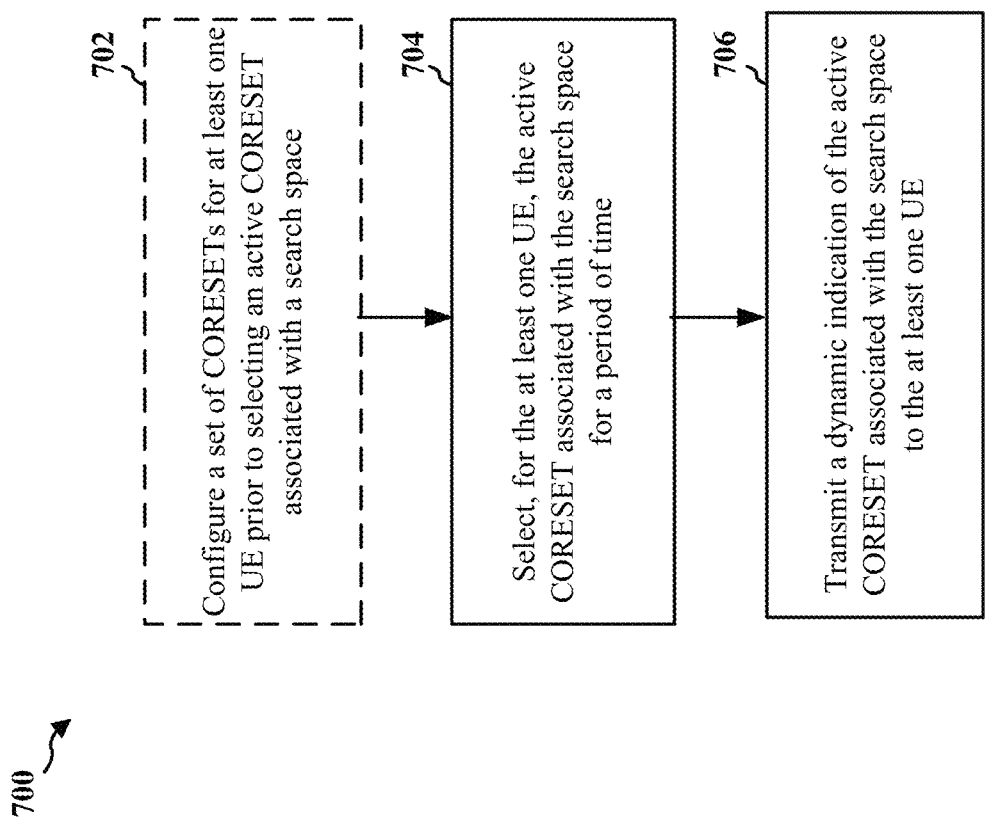
FIG. 7 is a flowchart of a method of wireless communication at a base station.

FIG. 7 is a flowchart 700 of a method of wireless communication. The method may be performed by a base station 310 (e.g., the base station 102/180, 310, 404, 604, 1150; the apparatus 802/802'; the processing system 914, which may include the memory 376 and which may be the entire base station 310 or a component of the base station 310, such as the TX processor 316, the RX processor 370, and/or the controller/processor 375). Optional aspects are illustrated in dashed lines. The method allows a base station to dynamically select and indicate an active CORESET to a UE (e.g., the UE 104, 350, 402, 602, 850). The method may allow for added PDCCH scheduling flexibility and may help a base station to serve different classes of UEs with overlapping resources.

At 702, the base station configures a set of CORESETs for at least one UE prior to selecting an active CORESET associated with the search space. For example, 702 may be performed by configuration component 806 from FIG. 8. For instance, referring to FIG. 6, the base station 604 may first configure and provide a set of CORESETs 606 to the UE. For example, referring to FIG. 5, the base station may configure a set of CORESETs 502, 504, 506 including different parameters 510 and associated indices 518 and provide the preconfigured CORESETs to the UE. The base station may alternatively or additionally configure a set of parameters 510 for a single active CORESET 508 and provide the preconfigured set of parameters to the UE. The set of CORESETs 606 or parameters may be provided to the UE, for example, in a RRC message.

At 704, the base station selects, for at least one UE, an active CORESET associated with a search space for a period of time. For example, 704 may be performed by selection component 808 from FIG. 8. The period of time may comprise a single slot or a set of consecutive slots. For instance, referring to FIG. 6, the base station 604 dynamically selects the active CORESET for a search space at block 608 and block 618. For example, referring to FIG. 5, the base station may select an active CORESET 508 from the set of CORESETS 502, 504, 506 for a search space 507 based on scheduling flexibility constraints, UE blind decoding power requirements, eMBB or URLLC UE power or timing requirements, or other factors. The search space may be, for example, a UE-specific search space for the UE 602, or a common search space for multiple UEs. In one example, the base station may select an active CORESET 508 by its index 518, which is uniquely assigned for different CORESETs. In another example, the base station may select one or more parameters 510 of an active CORESET 508 under a single index 518 associated with one CORESET. The base station may also select the slot(s) during which the active CORESET 508 may be applied. The indicated slot(s) may be the slot in which the indication is received, the next slot, or a set of upcoming consecutive (or non-consecutive) slots. For example, referring to FIG. 4, the base station 404 may dynamically indicate for the UE to monitor for PDCCH candidates in the active CORESET in the slot 406 expanded in FIG. 4 or in one or more subsequent slots 406.

A default beam associated with a PDSCH or a QCL assumption may be based on the set of CORESETs configured for the at least one UE. For example, referring to FIG. 6, after receiving the PDCCH 624 (or PDCCH 614), the base station 604 may transmit and the UE 602 may receive the PDSCH 626 using a beam associated with the active CORESET. The beam may be an indicated beam (e.g. in the dynamic indication 610 or 620), or a default beam (e.g. if no beam is indicated). For example, referring to FIG. 5, each CORESET 502, 504, 506 may be associated with a different beam 524, and the base station may transmit and the UE may receive PDSCH using the corresponding beam indicated for the active CORESET 508. Alternatively, for default beams, the base station may transmit and the UE may receive PDSCH using the beam 524 associated with the lowest CORESET ID in the indicated slot (e.g. CORESET-1) regardless of which active CORESET 508 is selected.

At 706, the base station transmits a dynamic indication of the active CORESET associated with the search space to the at least one UE. For example, 706 may be performed by indication component 810 from FIG. 8. The dynamic indication may indicate the active CORESET from a set of CORESETs configured for the at least one UE. The dynamic indication may be transmitted in a MAC-CE or in DCI. The DCI may indicate at least one active CORESET for multiple search spaces. The dynamic indication may comprise an index for the active CORESET. For example, referring to FIG. 6, after selecting the active CORESET at block 608 or block 618, the base station 604 provides the dynamic indication 610, 620 of the active CORESET associated with the search space to the UE 602. The dynamic indication may be provided in a MAC-CE, a DCI, or another message. For example, referring to FIG. 5, after the base station selects the active CORESET 508, the base station may transmit the index 518 associated with the active CORESET from the set of CORESETs 502, 504, 506 in a MAC-CE 520 or a DCI 522 to the UE. Additionally, a single DCI may indicate the active CORESET(s) for multiple search spaces. For instance, each CORESET 502, 504, 506 may be configured with the same respective parameters for different search spaces 507 (e.g. common and UE-specific search spaces), and the UE may monitor upcoming slots for the indicated active CORESET in any of the different search spaces.

The dynamic indication may also indicate a parameter for the active CORESET. The parameter may be selected from a set of preconfigured parameters for the active CORESET. The parameter may comprise at least one of an REG-to-CCE mapping parameter, a frequency allocation, or a number of symbols. For example, referring to FIG. 5, the base station may dynamically select the parameters 510 of the active CORESET 508 according to any of the pre-configured combinations of parameters 510 (e.g. based on scheduling needs, UE power and timing requirements, etc.), and the base station may indicate the parameters 510 of the active CORESET 508 to the UE in the MAC CE 520, DCI 522, or any other message. The parameters 510 may include, for example, a REG-to-CCE mapping 512, a frequency allocation 514, and a number of symbols or duration 516. Other parameters such as aggregation level, etc. may be included in the parameters 510.

Figure 8:
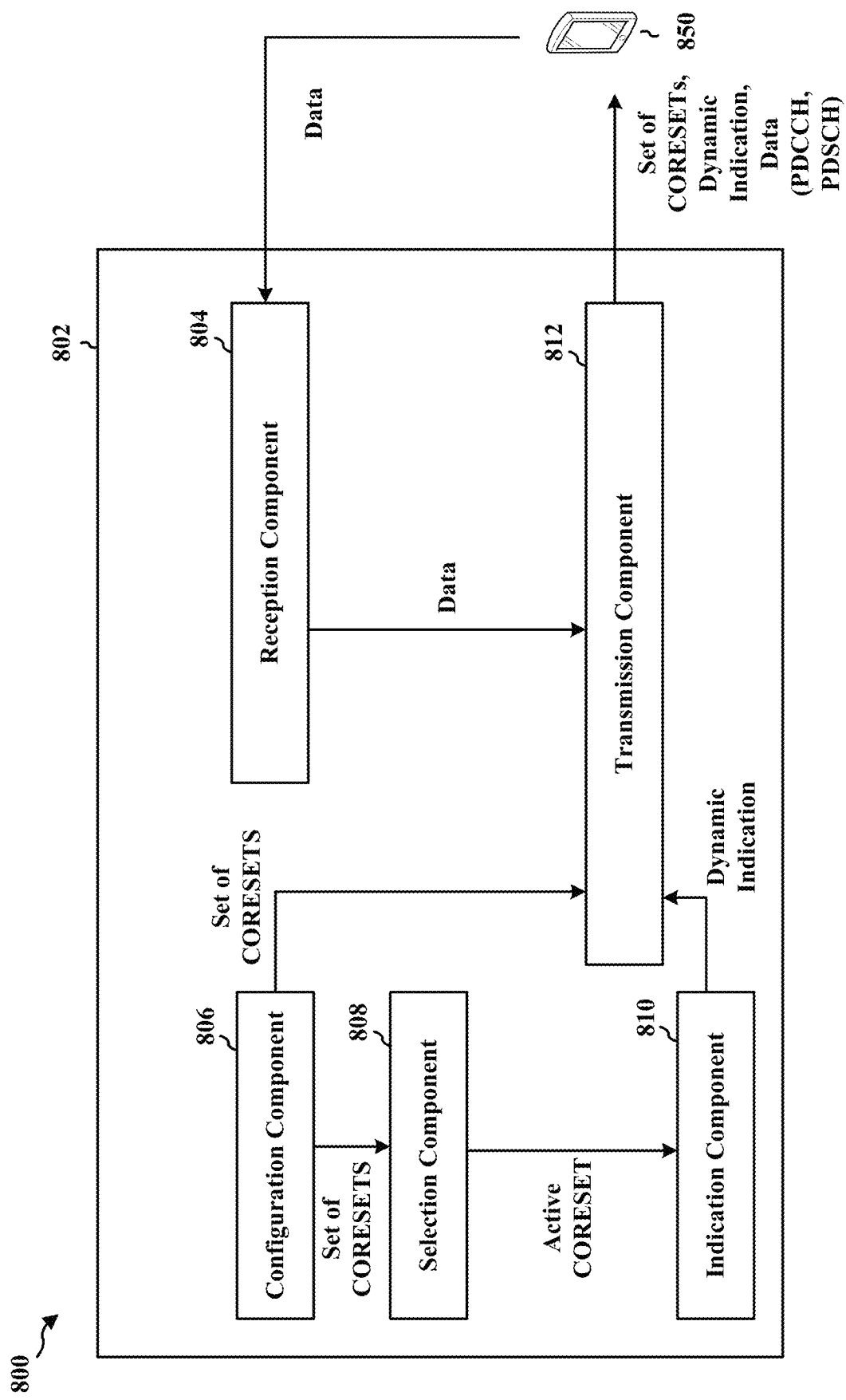
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a base station (e.g. a base station 102/180, 310, 404, 604, 1050) in communication with a UE 850 (e.g. a UE 104, 350, 402, 602). The apparatus includes a reception component 804 that is configured to receive data from at least one UE 850, and a configuration component 806 that configures a set of CORESETs for the at least one UE prior to selecting the active CORESET associated with the search space, e.g., as described in connection with 702 of FIG. 7. The apparatus includes a selection component 808 that is configured to select for the at least one UE 850 an active CORESET associated with a search space for a period of time, e.g., as described in connection with 704 of FIG. 7. The selection component 808 is further configured to select the active CORESET from the set of CORESETS configured by the configuration component 806. The apparatus also includes an indication component 810 that is configured to transmit, via a transmission component 812, a dynamic indication of the active CORESET associated with the search space and selected by the selection component 808 to the at least one UE 850, e.g., as described in connection with 706 of FIG. 7. The transmission component 812 is configured to transmit the set of CORESETs from the configuration component

806, the dynamic indication from the indication component 810, and data (e.g. PDCCH and PDSCH) to the UE 850.

The apparatus 802 may include additional components that perform each of the blocks of the algorithm in the aforementioned flowchart of FIG. 7. As such, each block in the aforementioned flowchart of FIG. 7 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
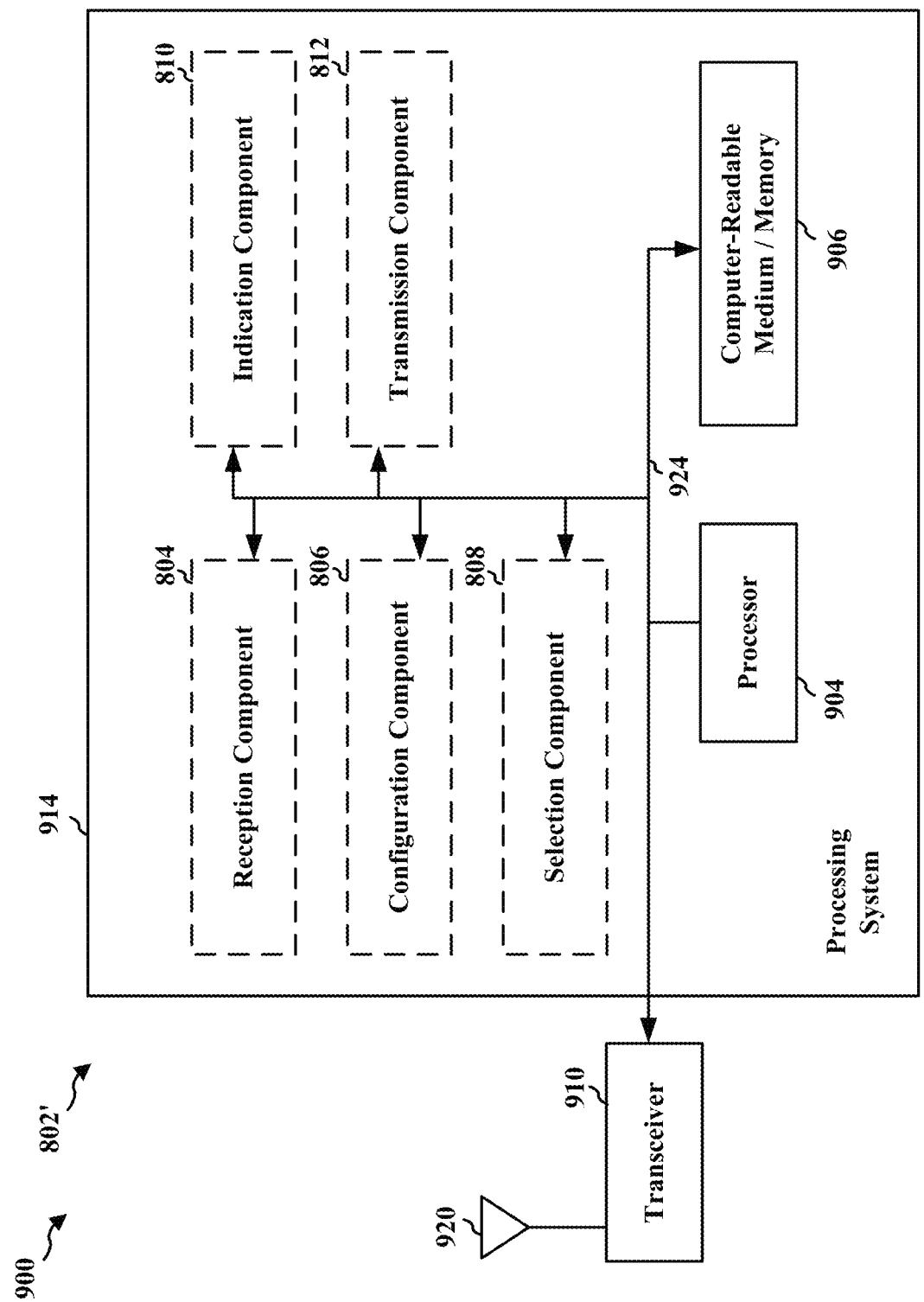
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375. Alternatively, the processing system 914 may be the entire base station (e.g., see 310 of FIG. 3).

In one configuration, the apparatus 802/802' for wireless communication includes means for selecting, for at least one UE, an active CORESET associated with a search space for a period of time. The apparatus further includes means for transmitting a dynamic indication of the active CORESET associated with the search space to the at least one UE.

In one configuration, the period of time may comprise a single slot. In another configuration, the period of time may comprise a set of consecutive slots.

In one configuration, the dynamic indication may indicate the active CORESET from a set of CORESETs configured for the at least one UE. The apparatus may further include means for configuring the set of CORESETs for the at least one UE prior to selecting the active CORESET associated with the search space.

In one configuration, a default beam associated with a PDSCH or a QCL assumption may be based on the set of CORESETs configured for the at least one UE.

In one configuration, the dynamic indication may be transmitted in a MAC-CE. In another configuration, the dynamic indication may be transmitted in DCI. The DCI may indicate at least one active CORESET for multiple search spaces.

In one configuration, the dynamic indication may comprise an index for the active CORESET. In another configuration, the dynamic indication may indicate a parameter for the active CORESET. The parameter may be selected from a set of configured parameters for the active CORESET. The parameter may comprise at least one of: a REG-to-CCE mapping parameter, a frequency allocation, or a number of symbols.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
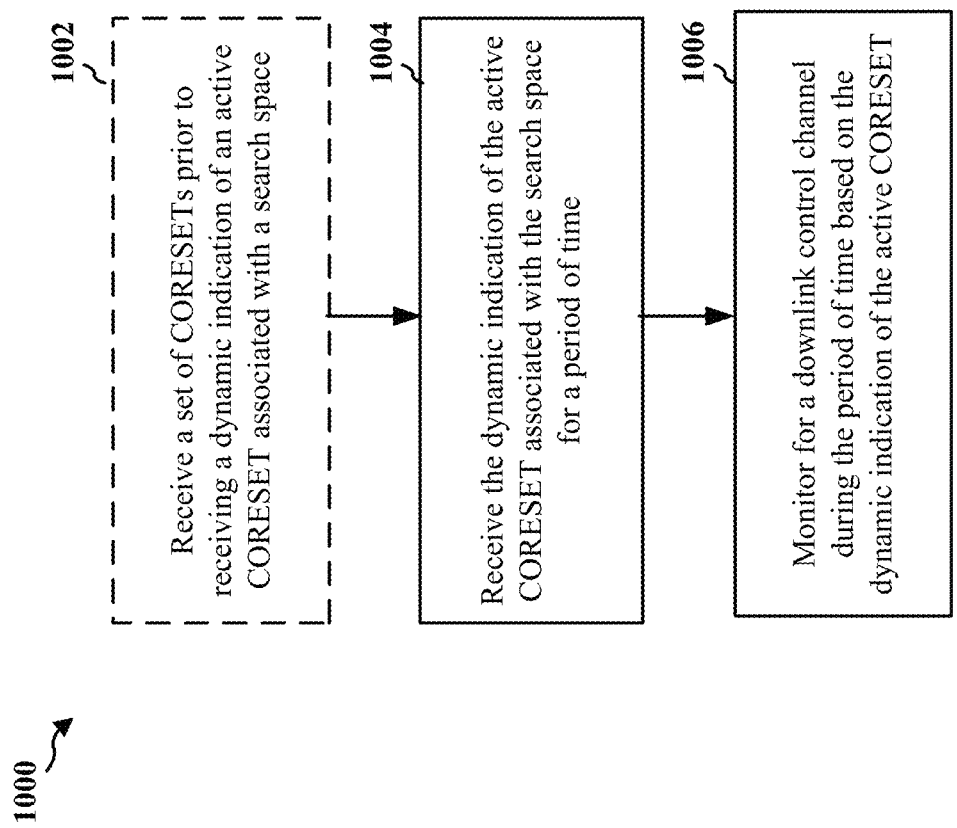
FIG. 10 is a flowchart of a method of wireless communication at a UE.

FIG. 10 is a flowchart 1000 of a method of wireless communication. The method may be performed by a UE 350 (e.g., the UE 104, 350, 402, 602, 850; the apparatus 1102/1102'; the processing system 1214, which may include the memory 360 and which may be the entire UE 350 or a component of the UE 350, such as the TX processor 368, the RX processor 356, and/or the controller/processor 359). Optional aspects are illustrated in dashed lines. The method allows a UE to receive a dynamic indication of an active CORESET from a base station (e.g., the base station 102/180, 310, 404, 604, 1050). The method may improve power savings at a UE and provide for greater flexibility in scheduling PDCCH.

At 1002, the UE receives a set of CORESETs prior to receiving a dynamic indication of an active CORESET associated with a search space. For example, 1002 may be performed by CORESET component 1106 from FIG. 11. For instance, referring to FIG. 6, the UE 602 may receive a set of CORESETs 606 configured by a base station 604. For example, referring to FIG. 5, the base station may configure a set of CORESETs 502, 504, 506 including different parameters 510 and associated indices 518, and the UE may receive the preconfigured CORESETs from the base station. The base station may alternatively or additionally configure a set of parameters 510 for a single active CORESET 508 and provide the preconfigured set of parameters to the UE. The set of CORESETs 606 or parameters may be received by the UE, for example, in a RRC message.

At 1004, the UE receives a dynamic indication of an active CORESET associated with a search space for a period of time. For example, 1004 may be performed by active CORESET component 1108 from FIG. 11. The period of time may comprise a single slot or a set of consecutive slots. The active CORESET may be from a set of CORESETs configured for the UE. For instance, referring to FIG. 6, after the base station selects the active CORESET at block 608 or block 618 (e.g. from the set of CORESETs 502, 504, 506 configured for the UE in FIG. 5), the UE 602 receives a dynamic indication 610, 620 of the active CORESET associated with the search space from the base station 604. The search space may be, for example, a UE-specific search space for the UE 602 (e.g. search space 507 in FIG. 5), or a common search space for multiple UEs. For example, referring to FIG. 5, after the base station selects the active CORESET 508, the UE may receive an index 518 associated with the active CORESET from the set of CORESETs 502, 504, 506 and one or more selected slot(s) during which the active CORESET 508 may be applied from the base station. The indicated slot(s) may be the slot in which the indication is received, the next slot, or a set of upcoming consecutive (or non-consecutive) slots. For example, referring to FIG. 4, the base station 404 may dynamically indicate the UE to monitor for PDCCH candidates in the active CORESET in the slot 406 expanded in FIG. 4 or in one or more subsequent slots 406.

A default beam associated with a PDSCH or a QCL assumption may be based on the set of CORESETs configured for the at least one UE. For example, referring to FIG. 6, after the UE receives the PDCCH 624 (or PDCCH 614), the base station 604 may transmit and the UE 602 may receive the PDSCH 626 using a beam associated with the active CORESET. The beam may be an indicated beam (e.g. in the dynamic indication 610 or 620), or a default beam (e.g. if no beam is indicated). For example, referring to FIG. 5, each CORESET 502, 504, 506 may be associated with a different beam 524, and the base station may transmit and the UE may receive PDSCH using the corresponding beam indicated for the active CORESET 508. Alternatively, for default beams, the base station may transmit and the UE may receive PDSCH using the beam 524 associated with the lowest CORESET ID in the indicated slot (e.g. CORESET-1) regardless of which active CORESET 508 is selected.

The dynamic indication may be received in a MAC-CE or in DCI. The DCI may indicate at least one active CORESET for multiple search spaces. The dynamic indication may comprise an index for the active CORESET. For example, referring to FIG. 6, after the base station selects the active CORESET at block 608 or block 618, the UE 602 receives the dynamic indication 610, 620 of the active CORESET associated with the search space from the base station 604. The dynamic indication may be received in a MAC-CE, a DCI, or another message. For example, referring to FIG. 5, after the base station selects the active CORESET 508, the UE may receive the index 518 associated with the active CORESET from the set of CORESETs 502, 504, 506 in a MAC-CE 520 or a DCI 522 from the base station. Additionally, a single DCI may indicate the active CORESET(s) for multiple search spaces. For instance, each CORESET 502, 504, 506 may be configured with the same respective parameters for different search spaces 507 (e.g. common and UE-specific search spaces), and the UE may monitor upcoming slots for the indicated active CORESET in any of the different search spaces.

The dynamic indication may also indicate a parameter for the active CORESET. The parameter may be from a set of preconfigured parameters for the active CORESET. The parameter may comprise at least one of a REG-to-CCE mapping parameter, a frequency allocation, or a number of symbols. For example, referring to FIG. 5, the base station may dynamically select the parameters 510 of the active CORESET 508 according to any of the pre-configured combinations of parameters 510 (e.g. based on scheduling needs, UE power and timing requirements, etc.), and the base station may indicate the parameters 510 of the active CORESET 508 to the UE in the MAC CE 520, DCI 522, or any other message. The parameters 510 may include, for example, a REG-to-CCE mapping 512, a frequency allocation 514, and a number of symbols or duration 516. Other parameters such as aggregation level, etc. may be included in the parameters 510.

At 1006, the UE monitors for a downlink control channel during the period of time based on the dynamic indication of the active CORESET. For example, 1006 may be performed by monitor component 1110 from FIG. 11. For instance, referring to FIG. 6, based on the dynamic indication of the new active CORESET, the UE 602 monitors for a set of PDCCH candidates from the base station 604 at block 612 or block 622. For example, the UE may perform blind decoding of the set of PDCCH candidates associated with the new active CORESET in the indicated slot(s) as described above. If decoding is successful, the UE receives the PDCCH 614, 624.

Figure 11:
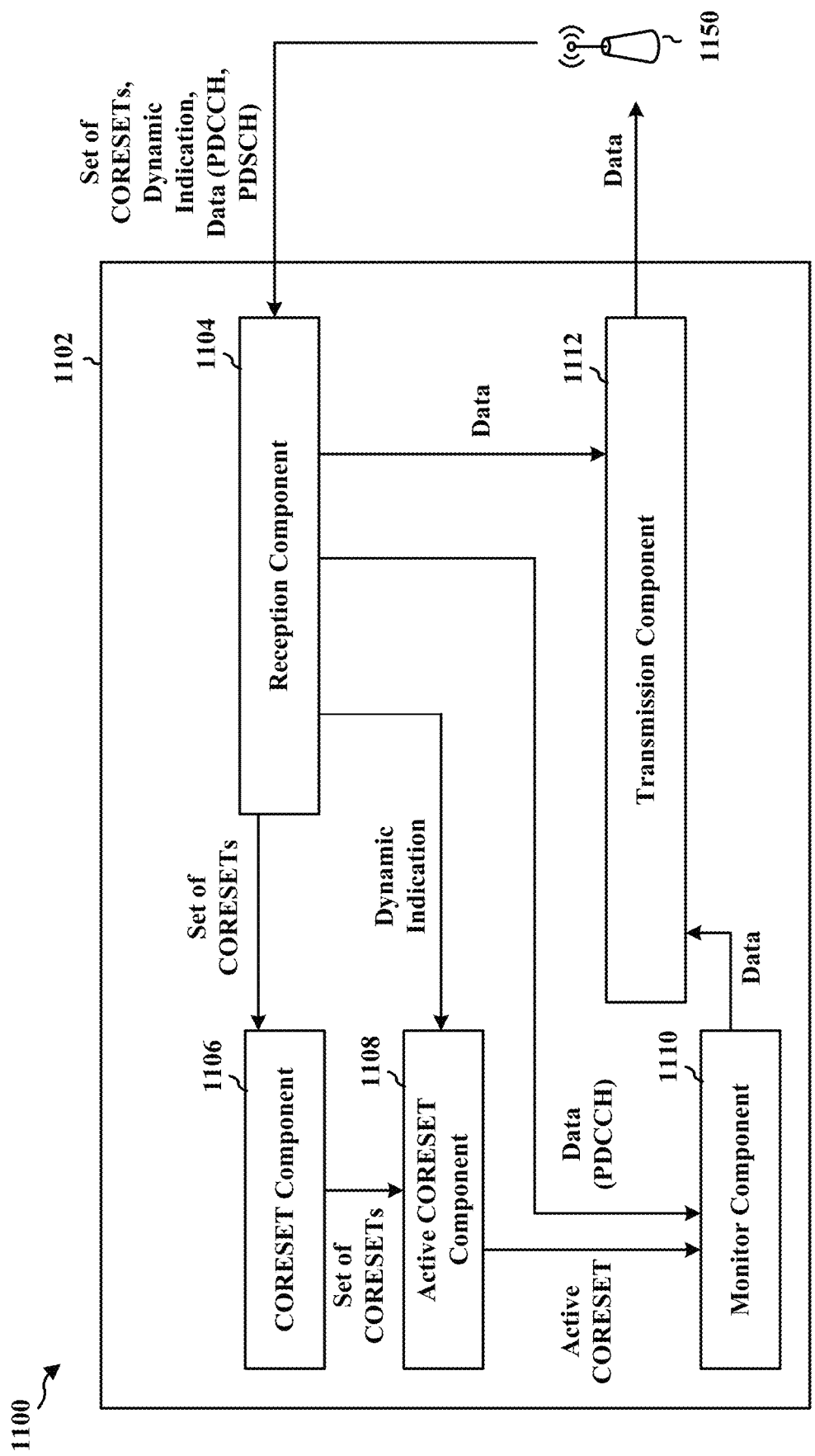
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE (e.g. a UE 104, 350, 402, 602, 850) in communication with a base station 1150 (e.g. a base station 102/180, 310, 404, 604). The apparatus includes a reception component 1104 that is configured to receive data (e.g. PDCCH and PDSCH), a set of CORESETs, and a dynamic indication from the base station 1150. The apparatus includes a CORESET component 1106 that is configured to receive via the reception component 1104 a set of CORESETs prior to receiving the dynamic indication of the active CORESET associated with a search space, e.g., as described in connection with 1002 of FIG. 10. The apparatus includes an active CORESET component 1108 that is configured to receive via the reception component 1104 a dynamic indication of an active CORESET associated with a search space for a period of time, e.g., as described in connection with 1004 of FIG. 10. The active CORESET component 1108 may be configured to determine the active CORESET based on the dynamic indication from the set of CORESETS received by the CORESET component 1106. The apparatus also includes a monitor component 1110 that is configured to monitor for a downlink control channel (e.g. PDCCH) during the period of time based on the dynamic indication of the active CORESET, e.g., as described in connection with 1006 of FIG. 10. The monitor component 1110 may be configured to monitor for a PDCCH received from the reception component 1104 based on the active CORESET determined by the active CORESET component 1108. The monitor component 1110 may be further configured to blindly decode the PDCCH and to transmit, via a transmission component 1112, data to the base station 1150 scheduled by the PDCCH. The transmission component 1112 of the apparatus is configured to transmit the data to the base station 1150.

The apparatus 1102 may include additional components that perform each of the blocks of the algorithm in the aforementioned flowchart of FIG. 10. As such, each block in the aforementioned flowchart of FIG. 10 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
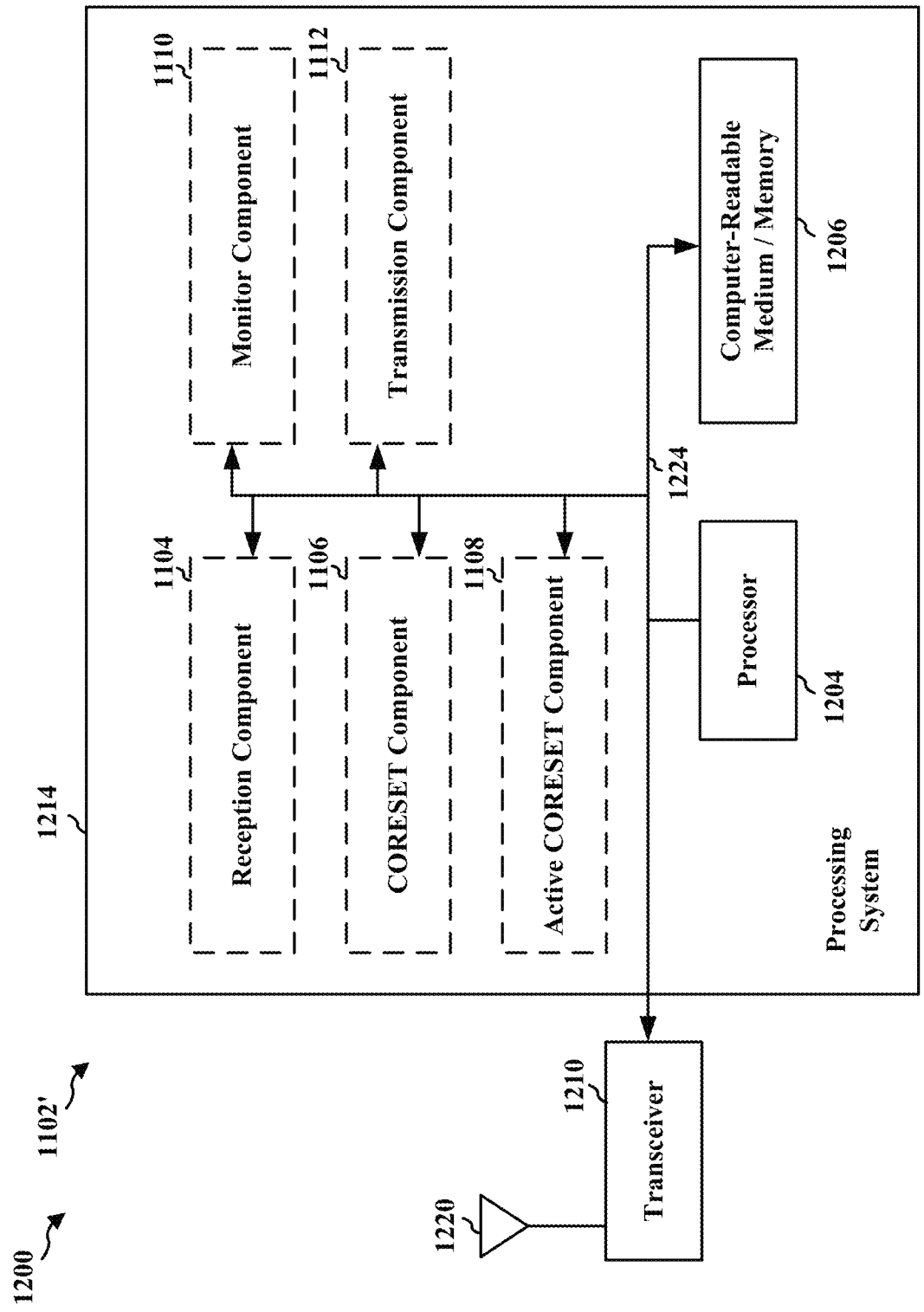
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for receiving a dynamic indication of an active CORESET associated with a search space for a period of time. The apparatus further includes means for monitoring for a downlink control channel during the period of time based on the dynamic indication of the active CORESET.

In one configuration, the period of time may comprise a single slot. In another configuration, the period of time may comprise a set of consecutive slots.

In one configuration, the active CORESET may be from a set of CORESETs configured for the UE. The apparatus may further include means for receiving the set of CORESETs prior to receiving the dynamic indication of the active CORESET associated with the search space.

In one configuration, a default beam associated with a PDSCH or a QCL assumption may be based on the set of CORESETs configured for the UE.

In one configuration, the dynamic indication may be received in a MAC-CE. In another configuration, the dynamic indication may be received in DCI. The DCI may indicate at least one active CORESET for multiple search spaces.

In one configuration, the dynamic indication may comprise an index for the active CORESET. In another configuration, the dynamic indication may indicate a parameter for the active CORESET. The parameter may be from a set of configured parameters for the active CORESET. The parameter may comprise at least one of: a REG-to-CE mapping parameter, a frequency allocation, or a number of symbols.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

As a result, the present disclosure allows a base station to dynamically select and indicate CORESETs with different frequency allocations or other parameters, thereby providing more flexibility in scheduling PDCCH for UEs, satisfying power saving requirements of the UEs, and serving different classes of UEs with different power or timing requirements (such as eMBB and URLLC UEs). For example, if the base station determines that a UE has low channel quality due to interference or other factors, the base station may dynamically signal a same or different CORESET having a higher aggregation level or number of symbols to potentially increase PDCCH blind decoding success of the UE. Moreover, if the base station determines that UE has low power requirements, the base station may dynamically signal the same or different CORESET having a lower aggregation level to potentially decrease the number of blind decodes required by the UE and thus decrease UE power consumption. Additionally, the base station may dynamically signal CORESETs with different aggregation levels and/or other parameters to fulfill the power and/or timing requirements of different UEs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a base station, comprising: selecting, for at least one user equipment (UE), an active control resource set (CORESET) associated with a search space for a period of time; and transmitting a dynamic indication of the active CORESET associated with the search space to the at least one UE.

Example 2 is the method of Example 1, wherein the dynamic indication is transmitted in response to a change in scheduling flexibility constraints, blind decoding power requirements, or timing requirements.

Example 3 is the method of Examples 1 and 2, wherein the dynamic indication indicates the active CORESET from a set of CORESETs configured for the at least one UE.

Example 4 is the method of any of Examples 1 to 3, further comprising: configuring the set of CORESETs for the at least one UE prior to selecting the active CORESET associated with the search space.

Example 5 is the method of any of Examples 1 to 4, wherein a default beam associated with a physical downlink shared channel (PDSCH) or a quasi-colocation (QCL) assumption is based on the set of CORESETs configured for the at least one UE.

Example 6 is the method of any of Examples 1 to 5, wherein the dynamic indication is transmitted in one of a medium access control-control element (MAC-CE) or downlink control information (DCI).

Example 7 is the method of any of Examples 1 to 6, wherein the DCI indicates at least one active CORESET for multiple search spaces.

Example 8 is the method of any of Examples 1 to 7, wherein the dynamic indication comprises an index for the active CORESET.

Example 9 is the method of any of Examples 1 to 8, wherein the dynamic indication indicates a parameter for the active CORESET, and wherein the parameter is selected from a set of configured parameters for the active CORESET.

Example 10 is the method of any of Examples 1 to 9, wherein the parameter comprises at least one of: a resource element group (REG) to control channel element (CCE) mapping parameter, a frequency allocation, or a number of symbols.

Example 11 is an apparatus for wireless communication at a base station, comprising:
a memory; and at least one processor coupled to the memory and configured to: select, for at least one user equipment (UE), an active control resource set (CORESET) associated with a search space for a period of time; and transmit a dynamic indication of the active CORESET associated with the search space to the at least one UE.

Example 12 is the apparatus of Example 11, wherein the dynamic indication indicates the active CORESET from a set of CORESETs configured for the at least one UE.

Example 13 is the apparatus of Examples 11 and 12, wherein the at least one processor is further configured to: configure the set of CORESETs for the at least one UE prior to selecting the active CORESET associated with the search space.

Example 14 is the apparatus of any of Examples 11 to 13, wherein the dynamic indication comprises an index for the active CORESET.

Example 15 is the apparatus of any of Examples 11 to 14, wherein the dynamic indication indicates a parameter for the active CORESET, and wherein the parameter is selected from a set of configured parameters for the active CORESET.

Example 16 is a method of wireless communication at a user equipment (UE), comprising: receiving a dynamic indication of an active control resource set (CORESET) associated with a search space for a period of time; and monitoring for a downlink control channel during the period of time based on the dynamic indication of the active CORESET.

Example 17 is the method of Example 16, wherein the dynamic indication is received in response to a change in scheduling flexibility constraints, blind decoding power requirements, or timing requirements.

Example 18 is the method of Examples 16 and 17, wherein the active CORESET is from a set of CORESETs configured for the UE.

Example 19 is the method of any of Examples 16 to 18, further comprising: receiving the set of CORESETs prior to receiving the dynamic indication of the active CORESET associated with the search space.

Example 20 is the method of any of Examples 16 to 19, wherein a default beam associated with a physical downlink shared channel (PDSCH) or a quasi-colocation (QCL) assumption is based on the set of CORESETs configured for the UE.

Example 21 is the method of any of Examples 16 to 20, wherein the dynamic indication is received in one of a medium access control-control element (MAC-CE) or downlink control information (DCI).

Example 22 is the method of any of Examples 16 to 21, wherein the DCI indicates at least one active CORESET for multiple search spaces.

Example 23 is the method of any of Examples 16 to 22, wherein the dynamic indication comprises an index for the active CORESET.

Example 24 is the method of any of Examples 16 to 23, wherein the dynamic indication indicates a parameter for the active CORESET, and wherein the parameter is from a set of configured parameters for the active CORESET.

Example 25 is the method of any of Examples 16 to 24, wherein the parameter comprises at least one of: a resource element group (REG) to control channel element (CCE) mapping parameter, a frequency allocation, or a number of symbols.

Example 26 is an apparatus for wireless communication at a user equipment (UE), comprising: a memory; and at least one processor coupled to the memory and configured to: receive a dynamic indication of an active control resource set (CORESET) associated with a search space for a period of time; and monitor for a downlink control channel during the period of time based on the dynamic indication of the active CORESET.

Example 27 is the apparatus of Example 26, wherein the active CORESET is from a set of CORESETs configured for the UE.

Example 28 is the apparatus of Examples 26 and 27, wherein the at least one processor is further configured to: receive the set of CORESETs prior to receiving the dynamic indication of the active CORESET associated with the search space.

Example 29 is the apparatus of any of Examples 26 to 28, wherein the dynamic indication comprises an index for the active CORESET.

Example 30 is the apparatus of any of Examples 26 to 29, wherein the dynamic indication indicates a parameter for the active CORESET, and wherein the parameter is from a set of configured parameters for the active CORESET.

What is claimed is:

1. A method of wireless communication at a base station, comprising:
   receiving, from at least one user equipment (UE), channel quality information indicating an unsuccessful decoding operation associated with a first active control resource set (CORESET) at the at least one UE;
   selecting, for the at least one UE, a second active CORESET associated with a search space for a period of time based on the channel quality information; and
   transmitting, to the at least one UE, a dynamic indication of the second active CORESET associated with the search space.

2. The method of claim 1, wherein the dynamic indication is transmitted in response to a change in scheduling flexibility constraints, blind decoding power requirements, or timing requirements.

3. The method of claim 1, wherein the dynamic indication indicates the second active CORESET from the set of CORESETs configured for the at least one UE.

4. The method of claim 3, further comprising:
   configuring the set of CORESETs for the at least one UE prior to the selecting the second active CORESET associated with the search space.

5. The method of claim 3, wherein a default beam associated with a physical downlink shared channel (PDSCH) or a quasi-colocation (QCL) assumption is based on the set of CORESETs configured for the at least one UE.

6. The method of claim 1, wherein the dynamic indication is transmitted in one of a medium access control-control element (MAC-CE) or downlink control information (DCI).

7. The method of claim 6, wherein the DCI indicates at least one active CORESET for multiple search spaces.

8. The method of claim 1, wherein the dynamic indication comprises an index for the second active CORESET.

9. The method of claim 1, wherein the dynamic indication indicates a parameter for the second active CORESET, and wherein the parameter is selected from a set of configured parameters for the second active CORESET.

10. The method of claim 9, wherein the parameter comprises at least one of:
    a resource element group (REG) to control channel element (CCE) mapping parameter,
    a frequency allocation, or
    a number of symbols.

11. An apparatus for wireless communication at a base station, comprising:
    a memory; and
    at least one processor coupled to the memory and configured to:
       receive, from at least one user equipment (UE), channel quality information indicating an unsuccessful decoding operation associated with a first active control resource set (CORESET) at the at least one UE,
       select, for the at least one UE, a second active CORESET associated with a search space for a period of time based on the channel quality information, and
       transmit, to the at least one UE, a dynamic indication of the second active CORESET associated with the search space.

12. The apparatus of claim 11, wherein the dynamic indication indicates the second active CORESET from the set of CORESETs configured for the at least one UE.

13. The apparatus of claim 12, wherein the at least one processor is further configured to:
    configure the set of CORESETs for the at least one UE prior to selecting the second active CORESET associated with the search space.

14. The apparatus of claim 11, wherein the dynamic indication comprises an index for the second active CORESET.

15. The apparatus of claim 11, wherein the dynamic indication indicates a parameter for the second active CORESET, and wherein the parameter is selected from a set of configured parameters for the second active CORESET.

16. A method of wireless communication at a user equipment (UE), comprising:
    transmitting, to a base station, channel quality information indicating an unsuccessful decoding operation associated with a first active control resource set (CORESET) at the UE;
    receiving, from the base station, a dynamic indication of a second active CORESET associated with a search space for a period of time based on the channel quality information; and
    monitoring for a downlink control channel during the period of time based on the dynamic indication of the second active CORESET.

17. The method of claim 16, wherein the dynamic indication is received in response to a change in scheduling flexibility constraints, blind decoding power requirements, or timing requirements.

18. The method of claim 16, wherein the active CORESET is from a set of CORESETs configured for the UE.

19. The method of claim 18, further comprising:
receiving the set of CORESETs prior to receiving the dynamic indication of the second active CORESET associated with the search space.

20. The method of claim 18, wherein a default beam associated with a physical downlink shared channel (PDSCH) or a quasi-colocation (QCL) assumption is based on the set of CORESETs configured for the UE.

21. The method of claim 16, wherein the dynamic indication is received in one of a medium access control-control element (MAC-CE) or downlink control information (DCI).

22. The method of claim 21, wherein the DCI indicates at least one active CORESET for multiple search spaces.

23. The method of claim 16, wherein the dynamic indication comprises an index for the second active CORESET.

24. The method of claim 16, wherein the dynamic indication indicates a parameter for the second active CORESET, and wherein the parameter is from a set of configured parameters for the second active CORESET.

25. The method of claim 24, wherein the parameter comprises at least one of:
a resource element group (REG) to control channel element (CCE) mapping parameter,
a frequency allocation, or
a number of symbols.

26. An apparatus for wireless communication at a user equipment (UE), comprising:
a memory; and
at least one processor coupled to the memory and configured to:
transmit, to a base station, channel quality information indicating an unsuccessful decoding operation associated with a first active control resource set (CORESET) at the UE,
receive, from the base station, a dynamic indication of a second active CORESET associated with a search space for a period of time based on the channel quality information, and
monitor for a downlink control channel during the period of time based on the dynamic indication of the second active CORESET.

27. The apparatus of claim 26, wherein the second active CORESET is from a set of CORESETs configured for the UE.

28. The apparatus of claim 27, wherein the at least one processor is further configured to:
receive the set of CORESETs prior to receiving the dynamic indication of the second active CORESET associated with the search space.

29. The apparatus of claim 26, wherein the dynamic indication comprises an index for the second active CORESET.

30. The apparatus of claim 26, wherein the dynamic indication indicates a parameter for the second active CORESET, and wherein the parameter is from a set of configured parameters for the second active CORESET.

* * * * *